United States Patent [19]

Julich

[11] 4,178,899

[45] Dec. 18, 1979

[54] LOW-FRICTION PISTON

[76] Inventor: Harry Julich, 6807 Winter La., Annandale, Va. 22003

[21] Appl. No.: 944,132

[22] Filed: Sep. 20, 1978

[51] Int. Cl.$^2$ .............................. F16J 9/20; F02F 3/28
[52] U.S. Cl. .................................. 123/193 P; 92/182; 277/216
[58] Field of Search ............ 92/162 R, 182, 127; 277/216, 236, 138, 165, 188 A; 123/193 P

[56] References Cited

U.S. PATENT DOCUMENTS

| | | | |
|---|---|---|---|
| 1,462,501 | 7/1923 | Barwald | 123/193 P |
| 3,704,893 | 12/1972 | Hill | 277/216 |
| 3,834,719 | 9/1974 | Shin et al. | 92/182 |
| 4,106,463 | 8/1978 | Curtis et al. | 92/182 |

FOREIGN PATENT DOCUMENTS

17888 of 1901 United Kingdom ............ 277/216

Primary Examiner—Ira S. Lazarus
Assistant Examiner—Craig R. Feinberg

[57] ABSTRACT

A piston comprising hydrodynamic skirts and crowns, pressure-actuated sealing rings of fixed excursion or balanced by hydrodynamic reactions, or no rings at all, stringent temperature control, ample oil on the cylinder wall even near top-dead-center, characterized by absence of abrasion between piston and cylinder and much lower friction, resulting thereby in higher fuel-economy and longer engine-life.

14 Claims, 11 Drawing Figures

$h_2 + h_2' = 3$  $mB = 5 \text{ (mils)}$
$h_1 = h_2 + 5$
$h_1' = h_2' + 5$
$a = 1 + 5/h_2$
$a' = 1 + 5/(3-h_2')$
$\Delta g = g(a) - g(a')$

Fig. 6b

Fig. 6c (Enlarged scale)

LOW-FRICTION PISTON

This invention relates to a low-friction piston in general, and more particularly to that used in the four-stroke internal combustion engine for automotive applications.

Considering that at the moderate angular speed of 3,000 rpm, a 6-cylinder engine in one hour only carries out more than 2 million strokes by means of pistons only a few mils ($10^2$ inches) less in diameter than the cylinders in which they move at peak linear speeds of about 35 mph, also undergoing peak decelerations of about 600 g's (at top-dead-center or TDC), further being subjected to peak pressures as high as 40 atmospheres or more, considering also that the side-thursts—namely the horizontal forces imparted to the piston by the crankrod—may reach many hundreds of pounds, that the temperatures in the piston-cylinder environment are high, about 80° C. at the bottom of the piston and well above 200° C. at the top, that such conventional piston-cylinder systems effectively seal the high pressures in the combustion chamber above the piston from the ambient pressure in the crankcase below, simultaneously also sealing the same spaces against oil-pumping from below to above, and that such internal-combustion (IC) engines satisfactorily perform over very long periods of duty, it is obvious that the conventional IC engine represents an astonishing (if taken for granted) feat of engineering.

In view of the severity of operation and excellence of performance just indicated, it is widely felt, and agreed with by this inventor, that the performance of the conventional engine, in particular that of the piston-cylinder system, as such is probably as effective as can be practically expected. The invention however recognizes that the conventional piston, for instance the four-stroke type used in automobile IC engines, is appreciably more frictional than the theoretical minimum recognized by the invention, and that accordingly significant improvements, proposed hereunder, can still be achieved, resulting in higher efficiency, that is, higher fuel economy, and in ancillary advantages such as longer engine life.

The representative conventional piston of the spark-ignited IC engine with four strokes comprises essentially a lower part, the skirt, through which the horizontal components of the crankrod forces acting or reacting on the piston are transmitted transversely to the cylinder wall, and an upper part, the crown, which holds and houses a number of rings for oil-control and for sealing the combustion chamber above the piston from the oil case below, to prevent both gas-leakage and oil-pumping. Typically there are two sealing rings, called compression rings, at the top of the crown, and one or more oil-control rings below them, in representative automobile engines. The compression rings do not form a solid circle but instead are finely split and prestressed to expand from the grooves in which they are housed to form intimate contact with the cylinder wall in order to achieve the desired sealing.

In view of the high number of strokes performed by such an engine, sealing against oil-pumping into the combustion chamber must be rigorous,—since even one drop per cycle pumped into said chamber for the operational conditions assumed above would mount into a loss of 500,000 drops an hour. While the two compression rings typically may and in fact do assume a great many shapes and profiles, the upper one at least it made to physically scrape the oil from the cylinder wall downward. The oil acting as a lubricant between piston and cylinder wall is provided from below and on the whole works its way up adequately until overcome by the deliberate scraping action of the uppermost compression ring, said action being most drastic near TDC. Accordingly there is little if any oil on the cylinder wall opposite said uppermost ring when the piston is in or near the TDC position, and this sealing ring also being prestressed to expand, in that region rubs against the inadequately lubricated cylinder wall, whereby, at least intermittently, high friction is generated in the piston cycle, namely near TDC, entailing abrasion both of the cylinder wall and of the ring. As a result fuel consumption is higher than it would be in the absence of such abrasion, and in the long run, the upper cylinder flares, the upper compression ring wears, until engine operations becomes excessively degraded.

Another factor is that ignition in the combustion chamber raises the gas temperature therein to the order of 5,000° F., and that this fire reaches that part of the cylinder-wall uncovered by the piston in proportion to its distance from TDC; if furthermore the upper groove housing the top compression ring is eroded enough by said ring having long spun and twisted in it on account of the strong frictional forces applied to it in the conventional case, the fire may also leak through the passage so abraded and reach the lower groove. It is commonly held that unless the oil on the cylinder wall near TDC be kept at a minimum, as in fact it is by the deliberate scraping of the upper compression ring in that area, deleterious effects such as burning, carbon-formation and ring-sticking will be excessive, and that if the fire were to reach the lower groove, it might or would destroy the oil-fil, or seal, there.

Finally the conventional piston within the slight clearance left to it inside the cylinder is known to tilt in general with respect to the cylinder axis. This is because no provision is made to control the attitude of a conventional piston, which can be observed to slightly tilt one way or another depending on the direction of the transverse force applied to it and on that of its longitudinal motion. As a consequence, even though the conventional piston skirt always rides on oil, this skirt friction too is higher than the minimum recognized by the invention.

As already stated, the object of the invention is to create a low-friction piston in order to achieve higher fuel-economy, for instance in automotive vehicles. The invention recognizes that on one hand it is possible to keep with impunity an oil-film as high on the cylinder-wall as the TDC position of the upper sealing ring, and on the other that said sealing ring can be designed to be a hydrodynamic reaction means, more particularly a hydrodynamic reaction surface means to expand by pressure-actuation and to be balanced by hydrodynamic forces or reactions or reach its end position against a limit means, in order to always maintain an adequate oil film as the seal between the combustion chamber and the crankcase or oil case, whereby abrasion is substantially entirely eliminated except perhaps with respect to the grit inherent in oil, further that the piston can be provided with specifically designed and cooperating hydrodynamic reaction means, more particularly hydrodynamic reaction surface means, or hydrodynamic bearing surfaces, in particular at the skirt, to balance the above mentioned horizontal or transverse thrusts, whereby the friction is reduced still further while simultaneously an attitude control of the piston with respect to the cylinder axis is achieved, so that on the whole significantly increased fuel-economy is obtained, and as an ancillary advantage, longer engine life realized.

The various elements of this invention cooperating towards the purpose of reducing piston friction as well as conventional means and methods not claimed per se but desirable in the implementation of this invention are discussed in detail below in relation to the drawings and examples. For the sake of overview, a complete qualitative discussion of the invention relating to the drawings is provided first, followed by numerical examples at the end.

Figures 1, 2:
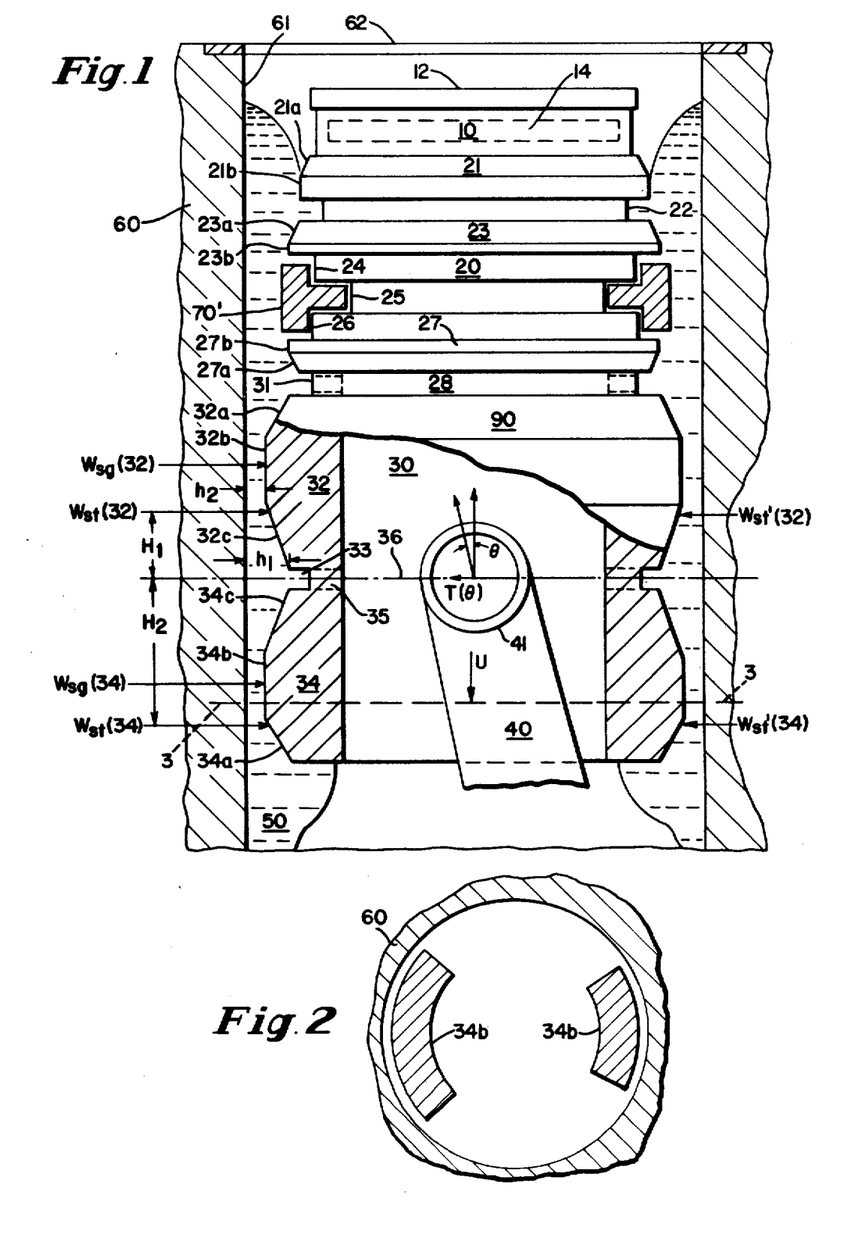
FIG. 1 shows an embodiment of the piston of the invention partly in profile and section.
FIG. 2 is a horizontal cross-section of squeeze-effect bearing surface used in the piston of the invention.

FIG. 1 shows essentially a vertical profile of one embodiment of the piston 90 of the present invention. The gaps between piston and cylinder wall are much exaggerated for clarity. The piston 90 moves within a cylinder 60 which is capped by an annular splash guard 62, which is optional. The piston is actuated by a conventional crankrod 40 with conventional wrist-pin 41. Similar to conventional pistons, piston 90 of the invention also consists of a crown and a skirt, but the crown 20 and skirt 30 of the invention are much different from the conventional design. In general the piston of the invention also comprises a heat-barrier at the top of the crown, said heat-barrier however being of conventional design and not an object of this invention.

The conventional heat-barrier 10 symbolically shown in FIG. 1 with its temperature-dropping chamber 14 or equivalent is generally desirable and sometimes mandatory in order to maintain adequate hydrodynamic properties in the temperature-sensitive oil film acting as the bearing for the various surfaces and components of the piston of the invention. For a representative automobile spark-ignited IC engine as considered herein, the temperature at the conventional upper compression ring is about 200° C. or more; the purpose of heat-barrier 10 is to drop this temperature to about 100° C. or less.

Below heat-barrier 10, there is a land 21 of asymmetrical shape which controls the oil flow by being down-pumping into the oil case if the oil film opposite it on cylinder wall 61 becomes excessively thick; reservoir R' intermittently stores and dispenses oil displaced during the periodic motion of the piston. Lands 23 and 27 are sufficiently recessed from wall 61 to generate only little hydrodynamic friction, but are hydrodynamically profiled to induce high and sufficient hydrodynamic reactions from the oil on wall 61 in case of improper approach, say malfunction; in another embodiment of the invention, however, this part of the crown is telescoped into the skirt of the invention, and the hydrodynamic surfaces of these lands 23 and 27 are then merged into one of the hydrodynamic surfaces of the skirt.

In the embodiment of FIG. 1, a sealing ring 70' is seated in a groove 25 between the lands 23 and 27. In the absence of significant pressure in the combustion chamber above, this ring 70' remains prestressed snug against groove 25; under the effect of pressure however, it will expand and form a narrower gap between itself and wall 61, thereby providing the required and increased sealing, as explained in further detail below in relation to FIG. 3 and 4. While only one sealing ring 70' is shown, obviously several can be used if desired.

The crown 20 is separated from the skirt 30 by a groove 28 with an optional oil drain 31 for return to the crank case or oil sump. Such optional oil drain may be associated with a conventional oil ring, of which the friction is relatively but not trivially small, which would be seated in groove 28.

The skirt 30 of the embodiment of FIG. 1 consists of two, well-localized, mirrorsymmetrical hydrodynamic bearing surfaces 32 (32a, 32b, 32c) and 34 (34a, 34b, 34c) which are symmetrically located resp. above and below the horizontal plane 36 in which acts the horizontal component T of the crankrod reaction. They are furthermore separated by a groove 33 with oil-drain 35 to the crankcase, again a conventional oil-ring being permissible, if desired, in said groove 33. For the conditions of operation indicated in FIG. 1, in which the velocity U is downward and the thrust T to the left, dynamic equilibrium is obtained from the hydrodynamic reactions shown. The major hydrodynamic bearing reactions are the "stretch effect" (which is roughly the waterski effect), termed $W_{st}$ herein, and the "squeeze effect", arising from the fact that for instance a film of oil trapped between two parallel and approaching surfaces requires time to escape, termed $W_{sq}$ herein. As indicated in FIG. 1, the stretch effect acts on both sides of the piston bearing surfaces, whereas the squeeze effect acts only where the piston approaches the cylinder wall. Surfaces 32 and 34 are made bidirectional because of the reciprocating nature of the piston motion. Because surfaces 32 and 34 subtend slants with respect to wall 61, namely surfaces 32a, 32c and 34c, 34a, they generate a stretch effect, parallel surfaces 32b and 34b generating a squeeze effect. When the geometry of the various surfaces of bearings 32 and 34 are properly selected for each and with respect to one another, the forces and moments of these hydrodynamic reactions can be made to balance the transverse thrust T for all longitudinal positions of the piston within the cylinder so as to control the piston attitude with respect to the cylinder axis, for instance to keep it parallel to said axis, and furthermore such selection of geometric and other parameters (for instance temperature and viscosity control) can be such that the hydrodynamic friction itself shall be minimized. The attitude control just cited is obtained by the cooperation of the two bearing surfaces 32 and 34 shown in FIG. 1. These well-localized bearing surfaces therefore fill a doubly antifrictional role: they minimize the friction compared with that encountered in the conventional case at the skirt, and by the attitude control they make possible they eliminate or at least reduce the friction which in the conventional case arises at the conventional crown because of the uncontrolled tilt in the prior state of the art. Finally, while two bearing surfaces with considerably symmetry are shown in FIG. 1 in illustrative manner, it should be clear that a different number of bearings with different geometries can also be resorted to in order to obtain similar effects.

FIG. 1 further shows oil 50 below the skirt and against wall 61; this oil is assumed filling the space between the piston and the said wall at least as high as ring 70', but is omitted from most of the drawings for the sake of clarity. Again, FIG. 1 shows a conventional crankrod 40 with wrist pin 41, and the transverse thrust $T(\theta)$.

It is furthermore assumed herein that the top of the crown is symmetrical enough that the transverse forces exerted on it by the pressure in the combustion chamber will substantially cancel out and therefore can be neglected from consideration.

FIG. 2 shows a horizontal cross-section through surfaces 34b along line 3—3 of FIG. 1. In this case the skirt's hydrodynamic bearing surfaces are unequal arcs of circle because a smaller surface is adequate to take care of the minor thrust, here shown occurring on the right-hand side. This allows a slight saving in hydrodynamic friction. Where desired, any or all the skirt bearing surfaces may be made 360°. For the sake of simplicity, FIG. 2 omits all other cross-sectional views of the components except that of cylinder 60.

Figure 3:
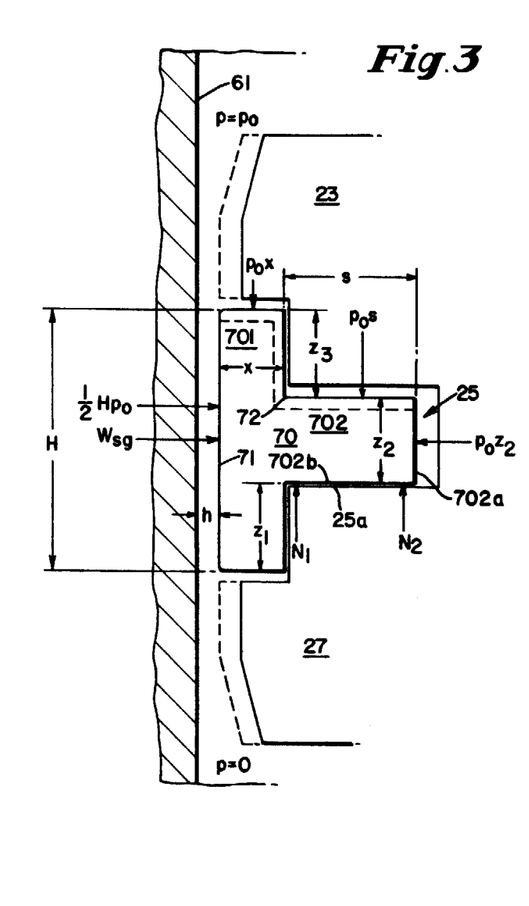
FIG. 3 is a vertical cross-section showing one embodiment of a sealing ring of the piston of the invention.
Figure 4:
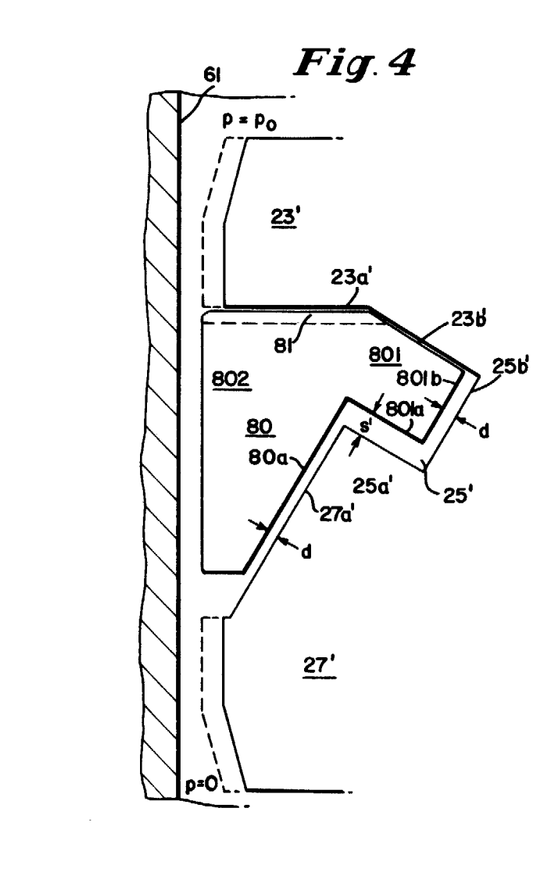
FIG. 4 is a vertical cross-section showing another embodiment of a sealing ring of the piston of the invention.

FIGS. 3 and 4 show specific embodiments of the sealing means 70' of FIG. 1. In FIG. 3, the sealing ring 70 is approximately T-shaped in its vertical cross-section and rests in a corresponding groove 25. Said T-shape consists of a head 701 and a stem 702. Ring 70 preferably is prestressed to slightly contract in the absence of pressure in the combustion chamber; it will expand as the combustion chamber pressure builds up, as explained hereunder. A slight play is provided between the height $z_2$ of said stem and the height of groove 25, and again between height H of the said head and the vertical dimension subtended by the groove faces of lands 23 and 27; further, the length s of stem 702 is slightly less than the depth of groove 25; finally fluting 72 is provided at the upper end, at the higher base of head 701, and along one side of stem 702 for the purpose of allowing automatic sealing control between the combustion-chamber and crankcase by providing easy propagation of the combustion-chamber pressure to those surfaces on which it should act, in particular during compression and combustion.

Because of the various clearances just indicated, two effects are obtained when pressure appears in the combustion chamber. In the first place, lower side 702b of stem 702 is pressed into a hermetic seal against groove surface 25a, so that there is a (mathematically) discontinuous pressure drop between the bottom of groove 25 and land 27, and a (mathematically) continuous pressure drop across the height H of the head 701 of the ring. The second effect is that a force per unit length $p_o z_2$, where $p_o$ is the pressure in the combustion chamber, pushes the bottom 702a of the stem toward wall 61, whereby the seal formed by the oil between the surface 71 of the head and wall 61 becomes tighter, and in fact, tight enough. As shown later under example 2, this automatic sealing behavior is feasible provided the pertinent parameters are properly selected. The dashed lines for lands 23 and 27 indicate other possible designs.

The embodiment of FIG. 3 is particularly suitable where relatively substantial thermal expansions or other changes in size take place, since the pressure will force the ring to expand until balanced by a thin enough film of oil. As the ring is necessarily split, large expansions may degrade for instance blow-by sealing, which might be remedied by using two sealing rings of the invention. While manifestly it is generally desirable to use the fewest possible parts, the invention places no restriction on the number of its sealing rings, whether of the embodiment just shown in FIG. 3 or of that of FIG. 4 discussed further below. Finally it is instructive to compare the behavior of the ring of FIG. 3 (and also that of FIG. 4) with the conventional case. Conventionally, the compression ring expands because prestressed and near TDC comes into at least intermittently abrasive contact with wall 61, whereas in the invention the sealing ring always rides on oil. Even at the very high peak pressures occurring in the combustion chamber of an automobile engine, say 50 atmosphere under some conditions, the hydrodynamic reactions provided by the oil film of the invention are sufficient to keep the ring surface 71 apart from wall 61. Accordingly the conventional abrasive friction is eliminated and replaced by hydrodynamic friction, which is much lower. Considering that the crown friction in the conventional piston is about 4/5 of the total piston friction, the reduction in friction achieved by the invention is accordingly substantial. An ancillary advantage, itself of great weight, is that the wear taking place in the conventional piston system at the cylinder wall and compression ring is eliminated by the invention, whereby much longer engine life is achieved.

FIG. 4 shows another embodiment of a sealing ring of the invention, which is applicable where dimensional changes in piston and/or cylinder-wall are relatively small and where a fixed excursion of the ring 80, which is also pressure-actuated, may be desirable. In this case the sealing ring 80 comprises a lower sliding surface 80a which makes an acute angle with the vertical and which in operation glides on the corresponding slanted surface 27'a of land 27'. Ring 80 at its inward base is provided with a foot 801 generally at right angle to body 802, face 801a of foot 801 being some distance S' apart from face 25'a of land 27' in the non-actuated case. Furthermore faces 801b and 25'b as well as 27'a and 80a are apart by a clearance d in the unloaded case, so that there be no jamming of ring 80 in groove 25'. A fluting 81 is provided at the top of ring 80 so pressure from the combustion chamber can easily communicate into groove 25', similarly to the provisions made for ring 70 of FIG. 3. Generally ring 80 is substantially prestressed to contract in order to assume the position shown in FIG. 4, namely abutting face 23'a and 23'b until overcome by a certain, preselected threshold pressure. This appreciable prestressing is desirable because ring 80 is susceptible to the inertial forces exerted on the piston because of its reciprocating motion, the said ring otherwise expanding when approaching bottom-dead-center (BDC). The prestressing imparted to ring 80 therefore ought to approximately correspond to the magnitude of the inertial forces it is exposed to. Accordingly a definite pressure threshold must be applied to ring 80 before it will expand. Once that threshold is exceeded, ring 80 expands as the pressure increases further until it reaches a stop means, represented here by limit-surface 25'a. Further increases in pressure obviously remain ineffective as regards the excursion of ring 80. Ring 80 therefore offers the characteristics of both a substantial pressure threshold and of a finite excursion.

In the conventional case, the compression rings spin azimuthally in their grooves, and furthermore twist in them, on which account these grooves ultimately wear out. The sealing means of the invention however, being shielded from abrasive contact with the wall 61, thereby also are protected from forces causing substantial spinning and/or twisting. Because the pressure-actuated motion between the rings 70 and 80 resp. shown in FIG. 3 and 4 and their seating grooves 25 and 25′ resp. is minute, i.e., only a few mils, & as this motion furthermore is lubricated by the residual oil between these surfaces in contact, both very low friction and hermetic contact is provided between faces 25a and 702b in FIG. 3 and 27′a and 801a in FIG. 4. It should be noted that even if there were some wear, the sealing between these surfaces would remain unaffected. Both surfaces 25a and 702 could wear considerably before any deterioration would be felt. Surfaces 80a and 27′a again could be considerably eroded without other effects than increasing the level at which the pressure ceases being a factor in the expansion of ring 80. Ring 80 in any event might be designed in fail-safe manner for such remote possibility to be balanced then by hydrodynamic reactions, similarly to ring 70 of FIG. 3. Again, the dashed lines for lands 23′ and 27′ denote other possible dimensions of these lands.

Figure 5A:
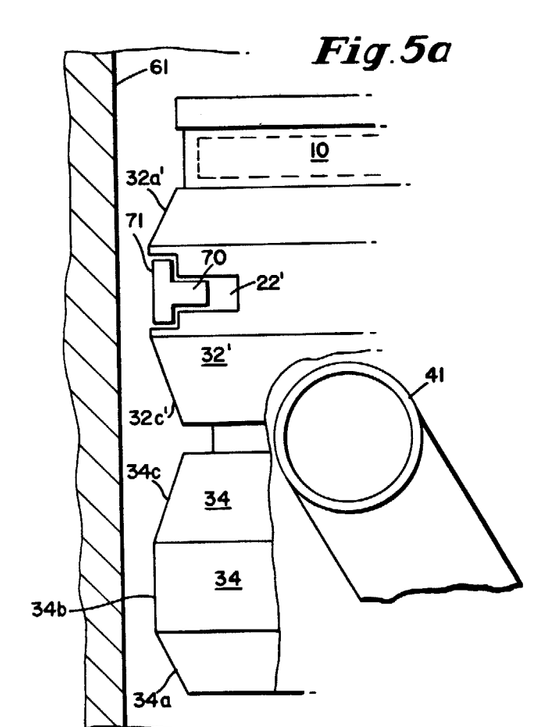
FIG. 5a, 5b represent one-side profiles of compact embodiments of a compact embodiment of the piston of the invention.
Figure 5B:
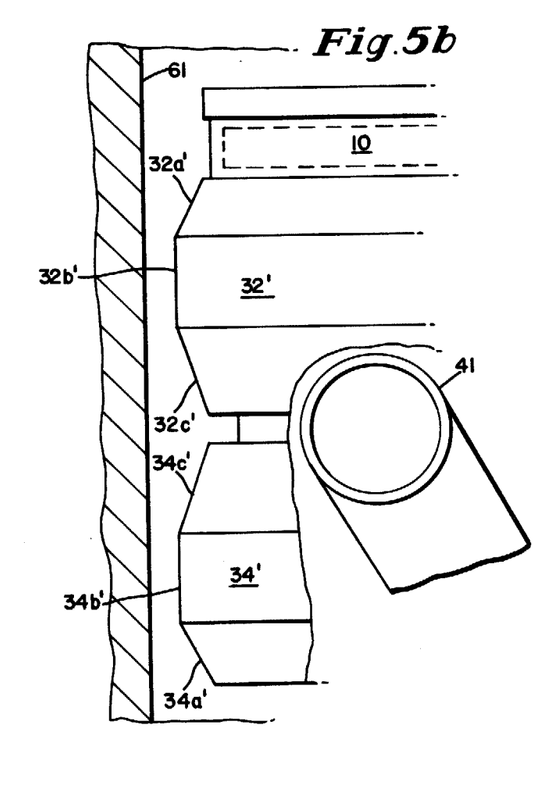

FIG. 5a, 5b are embodiments of the piston of the invention in which the crown and skirt as previously shown in FIG. 1 are partly telescoped into one another. In the embodiments of FIG. 5a, 5b, the lower hydrodynamic bearing surface 34′ (34′a, 34′b, 34′c) may be the same as or similar to the bearing 34 of FIG. 1. But the hydrodynamic bearing surface 32′ (32′a, 32′b, 32′c) above wrist pin 41 may be either the same as or similar to structure 32 of FIG. 1 as shown in FIG. 5b, or else said parallel surface 32′b may be entirely replaced by a face such as face 71 of ring 70 in FIG. 3, ring 70 being seated in groove 22′, as shown in FIG. 5a.

In the first embodiment relating to FIG. 5a bearing 32′ clearly requires some feature preventing oil-pumping into the combustion chamber. One way of obtaining this feature is to make surface 32′a sweep back more. In the second embodiment of FIG. 5b as shown in FIG. 3, the sweep-back feature just mentioned may also be combined with a deeper groove 22′ acting as an intermittent oil storage similarly to groove 22 of FIG. 1.

It is evident from inspection that the embodiments relating to FIG. 5 are quite compact; their actual size would be comparable to conventional partial-skirt pistons.

If desired, the piston of the invention can be supplemented by a splash guard 62 in the form of an annular disk placed on, or sunken into the top cylinder 60 as shown in FIG. 1. Otherwise, if at all, the piston of the invention requires no modification of the remaining engine. As the dimensions of the piston of the invention are approximately the same as those of conventional pistons, substitution can be effected without affecting the engine, though possibly selecting a crankrod of a slightly different size on occasion may be convenient. Furthermore the piston of the invention can be made of the same materials as its conventional counterpart, and conventional oils can be used. Accordingly the gain in fuel economy and in engine life afforded by this invention is achieved by only modifying the piston itself, that is, economically.

Because of little extant knowledge about the processes of wear (tribology), it is not really possibly to predict how much longer-lived both the piston of the invention and the cylinder in which it moves will be. It seems reasonable that mechanical creep will not occur because of insufficiently severe operational conditions, and that the life of the piston of the invention (and of the cylinder) will be determined by the other remaining degrading factors also affecting the conventional engine, namely corrosion, grit etc. It is known that in conventional engines, the skirt of the piston always rides on oil and furthermore wears relatively little, so that substantial extension of life can be expected for the piston of this invention.

Steady-state operation has been implied so far. Some thought however must also be given to strongly aperiodic motion. If for instance the engine is left shut off overnight, some of the oil film on wall 61 of FIG. 1 obviously will drain into the oil case. However enough of it will remain, whether trapped by capillarity, adhesion or stored in the various grooves, to allow the piston of the invention, when started again, to immediately take the path of least resistance away from the wall against which it had inevitably come to rest in intimate contact during the long previous period of inactivity. The viscosity of the cold oil being very high, correspondingly little oil only is needed to prevent any abrasion. Furthermore, the proportion of strongly aperiodic piston motions to those of steady state is vanishingly small in practice, so that even if there were some abrasion in such transient conditions—as conceivably might be the case for an engine being restarted when still hot—it would be equally trivial.

The problem, if any, of oil presence near the combustion chamber will now be considered. For all the raging fire's disquieting propinquity to the oil film recommended by this invention on the cylinder wall even near the TDC position of the piston, the commonly feared burning or destruction by fire can only take place if the oil is in the gaseous state; in other words, first the oil must evaporate. The heating which might cause such evaporation can arise from two sources, namely from the hot and/or burning gases during compression and combustion resp., and from the hot metal of the piston crown. As regards the latter case, oil burning in conventional engines is kept satisfactorily low, and as the piston of the invention is kept considerably cooler than the conventional one—at least where the preferred heat barrier is employed—then also there will be even less evaporation of oil from contact with the piston of the invention. Accordingly only the proximity of fire to the oil film is left to be considered.

Be it assumed the piston is past TDC during the combustion phase, so that there is fire in the volume of the cylinder already vacated by the piston in its descent, and that there is the desired film of oil on the wall 61 so bared. Some of the heat being generated will flow out of the bulk of the burning gas, which is a poor thermal conductor, through the oil film, which is also a poor thermal conductor but exceedingly thin, and then through the thickness of the cylinder, which is a metal and a very good thermal conductor, into the radiator coolant, which can be considered an infinitely good thermal conductor and in fact an infinite heat sink. It is intuitively clear that the infinite heat sink smack against the metal of the cylinder also will keep the oil-film temperature low. A tremendous temperture drop from the inside of the fire to the boundary between oil film and combustion gas is made possible by the thermal transfer coefficient $h_{th}'$ at said bondary on one hand and by the transient, through recurring nature of the caloric combustion pulse on the other, as the thermal time-constant of the cylinder metal-thickness much exceeds the length of said caloric pulse. Computations, omitted for the sake of brevity, indicate that the temperature of the oil film at the gas boundary might rise about 30° above that at the metal boundary. Such rise obviously is wholly harmless as regards evaporation. Furthermore, this rise is wiped out the moment the relatively cool piston again makes contact with the outer surface of the oil film and thereby reestablishes also the desirably viscosity. On the whole therefore, even though more oil is exposed in the case of the invention, it is kept cooler than conventionally, whereby too the conventionally feared factors of carbon formation, ring sticking etc., rather than being enhanced, on the contrary are reduced.

Finally, the minimum oil-film thickness between the bearing surfaces and the ring faces on one hand and the cylinder wall on the other will now be briefly considered. The bearing capacity from the hydrodynamic stretch and squeeze effects, and the friction all increase as the oil film thickness decreases. In addition, the film thickness may have to take into account the roughness of the surfaces opposite each other. Again machining tolerances also must be taken into account. Illustratively, it can be assumed that machining tolerances for the skirt bearing surfaces and the cylinder walls can be kept to within $+/-50$ microinches, and that the roughness of these surfaces is kept to within $+/-25$ microinches; then a nearest nominal approach of 300 microinches (0.3 mils) would leave at least 0.15 mils of oil film. No abrasion would take place under such conditions, all the more that hydrodynamic reactions for such a thin film are very high for the conditions considered herein. As shown by one of the examples below, the gap left at closest approach in a typical assumed case is considerably larger. The closest approach is one of the design criteria of the piston of the invention. It is affected by the dynamic conditions of operation, by the number and type of bearing surfaces and ring faces, and can be traded off to some extent against such parameters to optimize the particular operation. As a rule of thumb, the invention prefers a closest approach of at least 0.3 mils in general.

EXAMPLE 1

Skirt's closest approach to cylinder wall.

Symbols and parameters are resp. defined and assumed as follows,

W = hydrodynamic reaction $\mu$ = viscosity in reyns (lb-sec/in$^2$), assumed to be $3 \times 10^{-6}$ (10W40 oil at about 100° C.)

L = width of slider into plane of paper (FIG. 1), assumed to be 1½ inch $m_{32c}$ = slope of slider surface 32c, assumed to be $10^{-2}$ $m_{34a}$ = slope of slider surface 34a, assumed to be $\sqrt{2} \times 10^{-2}$ $a = h_1/h_2$ (FIG. 1), assumed the same for all surfaces, left side of FIG. 1

$a'$ = parameter a on the right side of FIG. 1

U = piston speed in inch/seconds $g(a) = \ln(a) - 2(a-1)/(a+1)$ $H_2/H_1$ (FIG. 1), assumed being 2

H = height of squeeze-effect surfaces 32b, 34b, assumed being ½ inch $h_f, h_i$ = final and initial gaps between wall 81 and surfaces 32b, 34b (FIG. 1) piston weight: assumed 1 lb crankrod/crankshaft-radius: assumed 4:1 clearance between diameters of wall 81 and surface 32b, 34b: assumed 3 mils engine speed: assumed 5,000 rpm (i.e., very high).

From inspection of FIG. 1, $$T(\theta) = \Delta W_{st}(32c) + 2W_{sq} + \Delta W_{st}(34a) \tag{1}$$

where the subscripts "st" and "sq" resp. refer to "stretch effect" and "squeeze effect".

The expressions for these hydrodynamic reactions can be found in general form for instance in the "Standard Handbook of Lubricatin Engineering," O'Connor & Boyd, McGraw-Hill, 1968, chapters 3 and 7, namely $$W_{st} = 6\mu U L g(a)/m^2$$

$$W_{sq} = -\mu H^3 L (dh/dt)/h^3$$

where m is the slope of the hydrodynamic surface, or slider, and where h is the size of the squeeze gap, whereby eq. (1) can be rewritten as $$\int \frac{T(\theta)d\theta}{w} = 0.41 \int \Delta g(Udt) + 0.56 \times 10^{-6}[1/h_f^2 - 1/h_i^2] \tag{2}$$

where $dt = d\theta/w$, w = angular speed (sec$^{-1}$), $Udt = ds$, s the distance traveled by the piston for the integration under consideration.

Figure 6A:
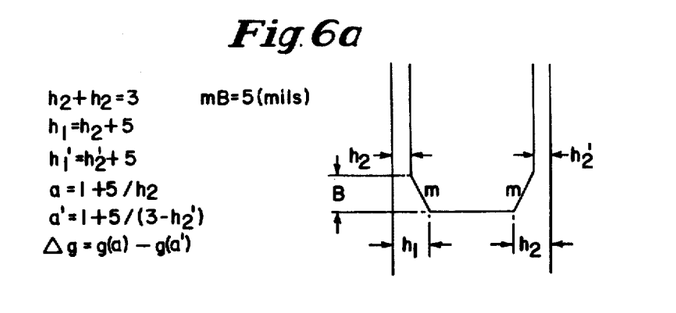
FIG. 6a6b, 6c show a symbolic two-sided hydrodynamic surface of the hydrodynamic parameter $\Delta g(a)$ used in the examples of this description.
Figure 6B:
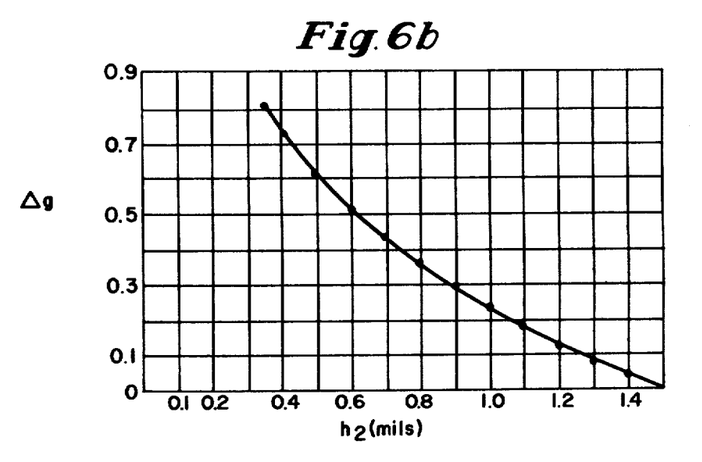
Figure 6C:
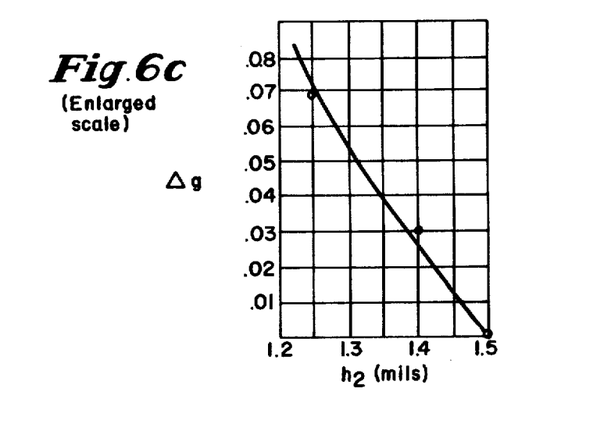
Figure 7:
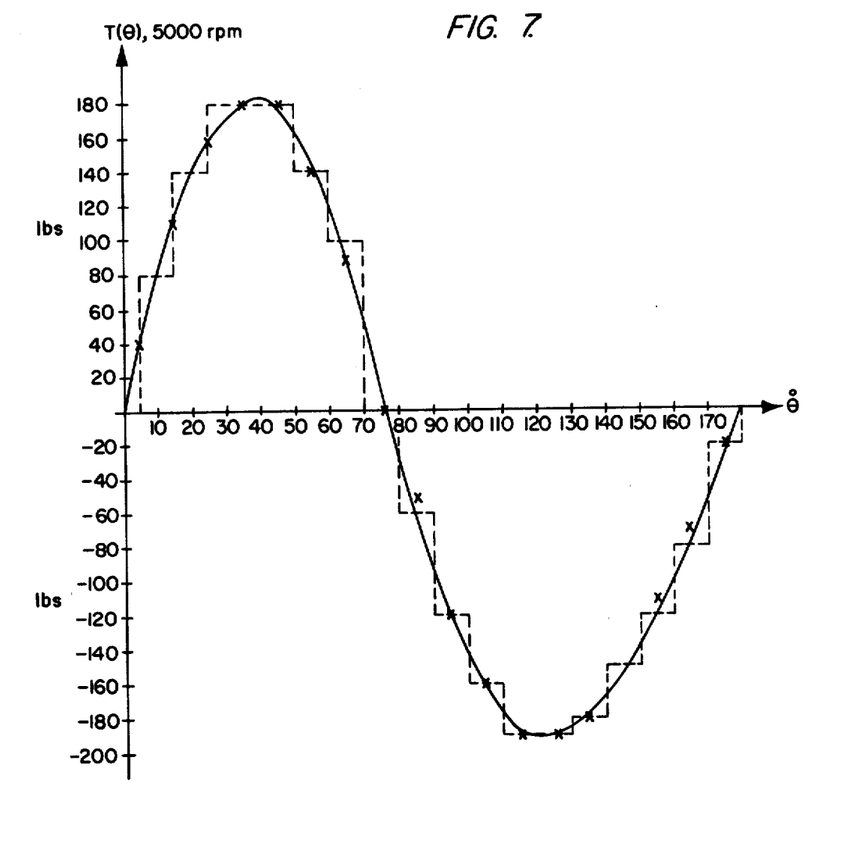
FIG. 7 is a graph showing the transverse thrust $T(\theta)$ used in the examples of this description.

FIG. 6b, 6c show that $\Delta g(a) = g(a) = a'$) is reasonably linear, so that $\Delta g(a) = g(\frac{1}{2}[h_i + h_f])$ and can be taken out of the integral sign in eq. (2). FIG. 7 shows the function $\int T(\theta)d\theta$ as the area under the curve for an engine speed of 5,000 rpm; for other engine speeds, the shown area under the curve is multiplied by $(N/5,000)^2$, where N is the particular rpm. Letting $h_i = 1.5$ mils, equation (2) for the maximum absolute integrated area,—namely the negative one), is approximately $$0.67 = 0.81\Delta g(a) + 0.56 \times 10^{-6}/h_f^2$$

As both terms on the right are functions of $h_f$, $h_f$ can be solved for, in this instance easily by trial-and-error numerical substitution. The closest approach so computed is approximately $h_f = 0.98$ mils. While this result was obtained considering only the transverse thrusts due to inertial forces, one should keep in mind that the magnitude of the transverse thrust from the power stroke is of the same order as for said inertial forces assumed above, and that furthermore $h_f$ varies relatively slowly in view of the sharp increase in hydrodynamic forces as it decreases.

An extreme case is now postulated at an engine speed of 500 rpm but with a power stroke equivalent to the enertial forces encountered at 5,000 rpm, 2) becomes $$4.5 = 0.81g + 0.56 \times 10^{-6}/h_f^2$$

and the solution yields approximately $h_f = 0.38$ mils.

Accordingly the two bearing surfaces of the skirt of FIG. 1 shall always ride safely on a film of oil throughout the entire range of operation. Obviously other results, specifically tailored to particular conditions, can be obtained by varying the diverse parameters involved.

EXAMPLE 2

Design parameters for ring 70; its closest approach to wall 61.

The surface 71 of ring 70 is meant to stay parallel to wall 61 during operation. Ring 70 being prestressed to contract, it will expand only if there is some pressure $p_{cc}$ in the combustion chamber, that is, during compression and power. Ring 70 is so designed that said expansion is counteracted only by the squeeze effect. For the sake of analytical simplicity, the lower surface of stem 702 is considered resting on surface 25a only at two points, where it is supported by reactions $N_1$ and $N_2$, (FIG. 3). As it is undesirable that ring 70 should tilt or twist in groove 25, each of the reactions $N_1$ and $N_2$ must be larger than zero. It is assumed for simplicity that $z_1 = z_2 = z_3 = H/3 = 1/6$ inch $h_i = 1.5$ mils $\mu = 3 \times 10^{-6}$ reyns The balancing force and moment equations can be written (FIG. 3)

| $N_1$ | + | $N_2$ | + | 0 | = $P_{cc}(x+s)L$ |
|---|---|---|---|---|---|
| 0 | + | 0 | + | $W_{sq}$ | = $P_{cc}LH/6$ |
| 0 | − | $sN_2$ | + | $HW_{sq}/6$ | = $\frac{1}{2} P_{cc}L[x^2 - s^2 - 0.96H^2]$ |

Accordingly the requirements that $N_1$ and $N_2$ each be larger than zero can be shown from the solution of the above simultaneous equations to be resp.

$[x + x^2/2s + (s^2 - H^2)/2s]$ and $[s^2 + H^2 - x^2]$, the former being the more stringent. Different constraints obviously will be obtained if the magnitudes of $z_1$, $z_2$ and $z_3$ are varied from the assumptions above.

The combustion chamber pressure $p_{cc}$ may be approximated as $p_{cc} = p^\circ_{cc} \sin(2\phi)$ between $\phi = 0°$ and $\phi = 90°$. While in an engine $\phi$ is related to the crankshaft angle $\phi$, for the purposes at hand, namely the expansion of the ring under combustion-chamber pressure, it can be treated independently since such expansion would take place any time such pressure would be applied.

Using the expression for the squeeze effect of example 1 in conjunction with that above for the combustion chamber pressure, namely $W_{sq} = -\mu H^3 L(dh/dt)/h^3 = p_{cc}LH/6 = LHp^\circ_{cc} \sin(2\phi)/6$ and letting $dt = d\phi/w$, where w is the angular frequency ($\sec^{-1}$), then integration results in $p^\circ_{cc}/[3\mu w H^2] = 1/h_f^2 - 1/h_i^2$ which for engine speeds of 5,000 and 500 rpm, and for $p^\circ_{cc}$ of 600 and 100 lb/in² resp. leads to $h_f$(5000 rpm) = 1.0 mil $h_f$(500 rpm) = 0.88 mils

EXAMPLE 3:

Sealing adequacy of ring 70.

The invention relies on the oil film between the ring or sealing means 70' and wall 61 to provide the sealing between the combustion chamber and the crankcase. Ring 70 of FIG. 3 is considered hereunder for its sealing properties. Because of the high pressures temporarily generated in the combustion chamber, there must be enough oil adhesion between the face 71 of said ring and wall 61 to prevent the oil film in-between from being blown clear into the crankcase. The rate $dQ/dt$ at which oil is forced through ducts or parallel surfaces (see for instance Streeter & Wylie, Fluid Mechanics, 6th ed. 1975, McGraw-Hill, p 242, eq. 5-13), is given by $-dQ/dt = [L(dp_{cc}/dH)h^3]/[12\mu]$ where $dp_{cc}/dH = p^\circ_{cc} \sin(2\phi)/H$.

Sealing adequacy can be ascertained by assuming there was a film of oil H high between wall 61 and surface 71, and by determining the the magnitude of $H_f$ at the end of the pressure pulse, the piston being considered stationary.

The amount of oil present at any time is merely $Q = LhH$ and in view of the results of example 2, a mean value $\bar{h}$ may be used, whereby $dQ = \bar{h}LdH = -[L\bar{h}^3 p^\circ_{cc} \sin(2\phi)d(2\phi)]/[24\mu wH]$ where w = angular frequency ($\sec^{-1}$). Letting the initial $H_i = \frac{1}{2}$ inch, and integrating, $H_f^2 = \frac{1}{4} - [\bar{h}^2 p^\circ_{cc}]/[6\mu w]$ If engine speeds and combustion-chamber peak pressures of 5000 rpm and 600 lb/in² and of 500 rpm and 100 lb/in² are resp. assumed, and remembering that $H_i = \frac{1}{2}$ inch, $H_f = 0.38$ and 0.47 inches resp. As the film of oil essentially remains in the gap, sealing is adequate. Replenishment of the fraction lost is provided by such means of the invention as the hydrodynamically asymmetrical land 21.

EXAMPLE 4:

Friction of crown 20 holding one ring 70

Provided lands 21, 23 and 27 are sufficiently recessed from wall 61, their hydrodynamic friction can be neglected. This is assumed the case here, and only the friction of ring 70, assumed to be the sole sealing ring, will be considered here. As surface 71 is parallel to wall 61, only shear friction is involved, which is given by $F_{sh}^{ring} = \mu LHU/h$ where
L = circumference = 10 inches
H = $\frac{1}{2}$ inch
Now $1/h^2 = 1/h_i^2 + p_{cc}^\circ[1 - \cos 2\phi]/6\mu wH^2$ where w(5,000 rpm) = $500\pi/3$, $U = U(\theta)$, $\theta = \phi - 20°$. To obtain the friction equivalent in horsepower P, $P = FU$, and U being in inch/sec, $P = 2.3 \times 10^{-9} U^2/h$.

The results for $F_{sh}{}^{ring}$ and P are more easily obtained by numerical methods than by integration, and table 1 below lists both the procedure and its results. These results, together with the friction for the skirt obtained further below, later will be compared with the experimentally ascertained total friction of a conventional piston.

Table 1

Let $w = v(5,000 \text{ rpm}) = 500/3$; $h_i = 1\frac{1}{2}$ mils; $\mu = 3 \times 10^{-6}$ reyns
Use $1/h_f{}^2 = 1/h_i{}^2 + [p^*{}_{cc}(1 - \cos2\phi)]/[6 \, wH^2] = 0.44 \times 10^6 + 0.26 \times 10^6(1 - \cos2\phi)$

| $\phi°$ | $2\phi°$ | $\cos2\phi$ | $1-\cos2\phi$ | $0.26 \times 10^6 \times (1-\cos2\phi)$ | $0.44 \times 10^6 + 0.26 \times 10^6 \times (1-\ldots)$ | $h_f$ |
|---|---|---|---|---|---|---|
| 10 | 20 | .94 | .06 | $.02 \times 10^6$ | $.46 \times 10^6$ | 1.48 mils |
| 20 | 40 | .77 | .23 | .06 | .50 | 1.41 |
| 30 | 60 | .50 | .50 | .13 | .57 | 1.33 |
| 40 | 80 | .17 | .83 | .22 | .66 | 1.23 |
| 50 | 100 | −.17 | 1.17 | .30 | .74 | 1.16 |
| 60 | 120 | −.50 | 1.50 | .39 | .83 | 1.10 |
| 70 | 140 | −.77 | 1.77 | .46 | .90 | 1.05 |
| 80 | 160 | −.94 | 1.94 | .50 | .94 | 1.03 |
| 90 | 180 | −1 | 2 | .52 | .96 | 1.02 |

$P = FU/6.6 \times 10^3 = 1.5 \times 10^{-4} \, FU$ horsepower $F = 2.3 \times 10^{-9} U^2/h_f$

| $\theta$ | $U(\theta)$ | $U^2(\theta)$ | $h_f(\theta)$ | $U^2/h_f$ | $2.3 \times 10^{-9} \times U^2/h_f$ |
|---|---|---|---|---|---|
| −10° | 220 | $.05 \times 10^6$ | $1.5 \times 10^{-3}$ | $.03 \times 10^9$ | .07 |
| 0 | 0 | 0 | 1.4 | 0 | 0 |
| 10 | 220 | .05 | 1.3 | .04 | .09 |
| 20 | 40 | .19 | 1.2 | .16 | .37 |
| 30 | 650 | .42 | 1.2 | .35 | .80 |
| 40 | 800 | .64 | 1.1 | .58 | 1.3 |
| 50 | 950 | .90 | 1.1 | .82 | 1.9 |
| 60 | 1050 | 1.1 | 1.0 | 1.1 | 2.5 |
| 70 | 1100 | 1.2 | 1.0 | 1.2 | 2.7 |
|   |   |   |   |   | 9.8 hp |

$[9.8 \text{hp}/9] \times 90°/720°] = . \neq < \eta\pi \, \mu\epsilon\alpha\nu$

EXAMPLE 5:

Friction of skirt 30 (FIG. 1).

The same parameters as for example 1 are used, namely $m_{34a} = \sqrt{2} m_{32c} = \sqrt{2} \times 10^{-2}$ $\mu = 3 \times 10^{-6}$ reyns H = height of squeeze surfaces = $\frac{1}{2}$ inch The friction $F^{skirt}$ is the sum of that from shear and from the stretch-effect (see O'Connor & Boyd, loc. cit., page 3.5), namely $F^{skirt} = 2\mu L[H/h + 2(q(a) + q(a'))(1/m_{32c} + 1/m_{34a'})]U$ and the power P' equivalent to such friction is merely $UF^{skirt}$, which, if U is in in/sec must be divided by $6.6 \times 10^3$ to be expressed in horse=power, and where the term $q(a) + q(a')$, with a and a' resp. referring to the left-hand and right-hand sides of the bearing surfaces of FIG. 1, is almost constant considering that h varies only slowly for the operational conditions considered, said term being about 1.1 for 5,000 rpm; h in the expression above is taken as $\bar{h} = 1.2$ mils.

The mean power $\bar{P}'$ can be computed by integrating with respect to $\theta$ from zero to $\pi$, as U is a known function of $\theta$, (see L. Lichty, Combustion Engine Processes, 1967, McGraw-Hill, p 585), whereby $U^2$ can be approximately written as $U^2 = [4\pi N/60] \times [\sin^2\theta + \frac{1}{2} \sin^2\theta \cos\theta]$.

Upon substituting the numerical values above and integrating with respect to $\theta$, one obtains $$\bar{P}^1 = (1.2/\pi) \int_0^\pi (\sin^2\theta + \frac{1}{2} \sin^2\theta\cos\theta)d\theta = 0.6 \text{ hp}.$$

Before comparing the overall friction of the piston of the invention with a conventional one, it is worth noting that the skirt of the piston of the invention, besides providing an attitude control (FIG. 1), also is less frictional than the conventional skirt. To that end FIG. 8 (from E. F. Obert, "Internal combustion engines and air pollution", 1973, Intex, page 486,) shows the empirical friction curve of an engine with cylinders and strokes comparable to the engine considered above. At 5,000 rpm the total measured friction is about 54 hp or 9 hp per piston. It is generally assumed that the conventional skirt friction is about 1/5 − ¼ of the total friction, so that the skirts of FIG. 8 would be frictional by about 1.8−2.3 hp compared with the figure of 0.6 hp determined above in this example for the piston of the invention.

EXAMPLE 6

Power-gain and Fuel—Economy of the Invention.

Considering the crown friction first, if $p_{cc}°/w$ is considered essentially constant—a reasonable assuption—, then the crown frictional power loss $\bar{P}'$ is proportional to $N^2$, where N = rpm, whereby, using the results from example 5, $\bar{P}'(5,000 \text{ rpm}) = 0.61$ hp/piston
$\bar{P}'(2,500 \text{ rpm}) = 0.15$ hp/piston
$\bar{P}'(1000 \text{ rpm}) = 0.024$ hp/piston Considering next the power loss $\bar{P}$ in the skirt, which is also essentially proportional to $N^2$, and using the results from example 4, we obtain $\bar{P}(5,000 \text{ rpm}) = 0.14$ hp/piston $\bar{P}(2,500 \text{ rpm}) = 0.04$ hp/piston P(1000 rpm)=0.005 hp/piston.

Figure 8:
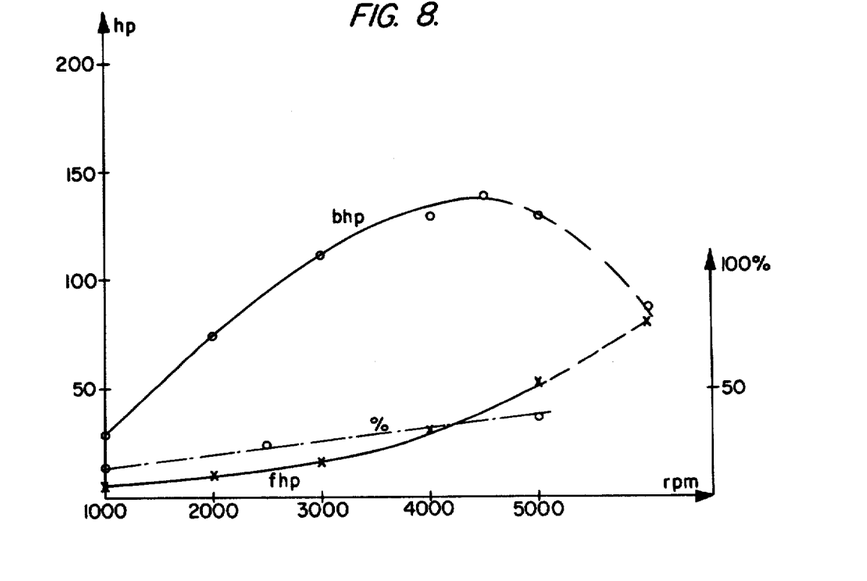
FIG. 8 is a reproduction of the performance graph, of a conventional engine, used for a theoretical comparison with the performance of the piston of the invention.

The power losses due to friction in the engine equipped with the pistons of the invention can now be compared with those experimentally observed for a conventional engine, for instance the V-6 of FIG. 8. The P̄' and P̄ values listed above must be added for each rpm and then multiplied by 6, the number of pistons. Table 2 immediately below provides this comparison:

Table 2

| Engine speed | 5000 rpm | 2500 rpm | 1000 rpm |
|---|---|---|---|
| conventional power loss | 54 hp | 23 hp | 3.8 hp |
| invention's power loss | 4½hp | 1.2 hp | 0.2 hp |
| invention's power saving | 50 hp | 22 hp | 3.6 hp |
| conventional brake power | 130 hp | 95 hp | 30 hp |
| power gain (% fuel gain) | 38% | 23% | 12% |

The total useful power gain, as a percentage, is shown in dash-dot lines in FIG. 8.

The improvements shown in table 2 apply to a hot engine. A cold engine when started remains inefficient for about 5 miles or more in the conventional case, to the point of using twice the fuel of what it would when hot. If commuting travel is assumed, say 20 miles one way, further that the hot-engine fuel consumption in such stop-and-go traffic is 15 mph while only 7½ for a cold engine, and if further it is assumed that the heat-barrier recommended by this invention in addition to its primary function also cuts the inefficient start-up phase in two, whereby only 2½ miles would be traveled under such adverse conditions, the gain in fuel economy from that fact alone would be about 12%; as the engine speed for such traffic would be somewhere between 1000 and 2500 rpm for the case illustrated herein, there would also be a gain in efficiency somewhere between 12% and 26% (see table 2), say 19% from the reduction in friction made possible by the invention, and therefore the total gain in commuting travel efficiency would be about 31%.

I claim:

1. A piston for minimizing friction and substantially eliminating abrasion, said piston being received in a bore defined by a generally cylindrical cylinder wall, and said piston including surface means for responding to hydrodynamic reactions within said bore for maintaining said entire piston at all times at a minimum distance from said cylindrical wall to substantially entirely eliminate abrasive friction during relative motion of said piston within said bore, said piston carrying at least one expansible sealing ring for sealing against oil-pumping and gas-leakage as a function of pressure differential across said piston, said sealing ring being at at all times out of contact with said cylinder wall, and said hydrodynamic surface reaction means is formed by at least said sealing ring 2. A piston for minimizing friction and substantially eliminating abrasion, said piston being received in a bore defined by a generally cylindrical cylinder wall, and said piston including surface means for responding to hydrodynamic reactions within said bore for maintaining said entire piston at all times at a minimum distance from said cylindrical wall to substantially entirely eliminate abrasive friction during relative motion of said piston within said bore, said piston carrying at least one expansible ring for sealing against oil-pumping and gas-leakage as a function of pressure differential across said piston, said hydrodynamic surface reaction means is formed by at least said sealing ring and stop means for limiting expansion of said sealing ring at a predetermined maximum out of contact with said cylinder wall.

3. A piston for minimizing friction and substantially eliminating abrasion, said piston being received in a bore defined by a generally cylindrical cylinder wall, and said piston including surface means for responding to hydrodynamic reactions within said bore for maintaining said piston at a minimum distance from said cylindrical wall to substantially entirely eliminate abrasive friction during relative motion of said piston within said bore, said piston carrying at least one expansible sealing ring for sealing against oil-pumping and gas-leakage as a function of pressure differential across said piston, and said hydrodynamic reaction surface means is formed by at least said sealing ring means for mounting said sealing ring for acute angle guided movement relative to said cylinder axis, and said sealing ring being at all times out of contact with said cylinder wall.

4. A piston for minimizing friction and substantially eliminating abrasion, said piston being received in a bore defined by a generally cylindrical cylinder wall, and said piston including surface means for responding to hydrodynamic reactions within said bore for maintaining said piston at a minimum distance from said cylindrical wall to substantially entirely eliminate abrasive friction during relative motion of said piston within said bore, said piston carrying at least one expansible sealing ring for sealing against oil-pumping and gas-leakage as a function of pressure-differential across said piston, and said hydrodynamic reaction surface means is formed by at least said sealing ring means for mounting said sealing ring for acute angle guided movement relative to said cylinder axis, said sealing ring is prestressed radially inward to contract to overcome inertial forces due to piston motion, and said sealing ring being at all times out of contact with said cylinder wall.

5. A piston for minimizing friction and substantially eliminating abrasion, said piston being received in a bore defined by a generally cylindrical cylinder wall and said piston including surface means for responding to hydrodynamic reactions within said bore for maintaining said piston at a minimum distance from said cylindrical wall to substantially entirely eliminate abrasive friction during relative motion of said piston within said bore, said piston carrying at least one expansible sealing ring for sealing against oil-pumping and gas-leakage as a function of pressure differential across said piston, and said hydrodynamic reaction surface means is formed by at least said sealing ring and said sealing ring is prestressed radially inwardly to contract until overcome by a predetermined pressure differential across said piston, and said sealing ring being at all times out of contract with said cylinder wall.

6. A piston for minimizing friction and substantially eliminating abrasion, said piston including ring means being received in a bore defined by a generally cylindrical cylinder wall, and said piston including means for responding to hydrodynamic reactions comprising at least two hydrodynamic reaction surface means within said bore for maintaining said entire piston and ring means at all times at a minimum distance from said cylindrical wall to substantially entirely eliminate abrasive friction during relative motion of said piston within said bore.

7. The piston as defined in claim 6 wherein said at least two hydrodynamic reaction surface means cooperatively control the attitude of said piston with respect to said cylinder axis and balance thrusts transverse to the cylinder axis acting on said piston.

8. The piston as defined in claim 6 wherein said at least two hydrodynamic reaction surface means cooperatively control the attitude of said piston with respect to said cylinder axis and balance thrusts transverse to the cylinder axis acting on said piston, and said at least two hydrodynamic reaction surface means are bi-directional sloping hydrodynamic reaction surfaces.

9. The piston as defined in claim 6, wherein said at least two hydrodynamic reaction surface means cooperatively control the attitude of said piston with respect to said cylinder axis and balance thrusts transverse to the cylinder axis acting on said piston, said at least two hydrodynamic reaction surface means are bi-directional sloping hydrodynamic reaction surfaces, and at least two of said at least two hydrodynamic reaction surface means further each includes a hydrodynamic reaction surface parallel to said cylinder wall to thereby achieve a substantial squeeze effect.

10. The piston as defined in claim 6, wherein said at least two hydrodynamic reaction surface means cooperatively control the attitude of said piston with respect to said cylinder axis and balance thrusts transverse to the cylinder axis acting on said piston, and said at least two hydrodynamic reaction surface means are bi-directional sloping hydrodynamic reaction surfaces each further including a squeeze effect surface, said piston having a skirt and said sloping hydrodynamic reaction surfaces being arranged on said skirt in mirror-symmetrical relation to each other on either side of a plane in which act the transverse thrusts.

11. The piston as defined in claim 6 wherein said at least two hydrodynamic reaction surface means cooperatively control the attitude of said piston with respect to said cylinder axis and balance thrusts transverse to the cylinder axis acting on said piston, said piston having a crown and a skirt, at least one of said at least two hydrodynamic reaction surface means being arranged on said crown, and at least another of said two hydrodynamic reaction surface means being arranged on said skirt.

12. The piston as defined in claim 6, wherein said at least two hydrodynamic reaction surface means cooperatively control the attitude of said piston with respect to said cylinder axis and balance thrusts transverse to the cylinder axis acting on said piston, and arcs of circle subtended by said at least two hydrodynamic reaction surface means range up to and including 180°.

13. The piston as defined in claim 1 including a crown having at least one groove storing oil at least intermittently, said crown furthermore including asymmetric hydrodynamic surface means for pumping oil preferentially in one direction to prevent oil loss when oil film on said cylinder wall exceeds a predetermined thickness.

14. The piston as defined in claim 1 wherein said means responsive to hydrodynamic reactions further seals said piston relative to said cylinder wall through 360°.

* * * * *